United States Patent
Sbarro (10) Patent No.: US 7,473,166 B2
(45) Date of Patent: Jan. 6, 2009

(54) METHOD FOR MAKING A PICNIC ROAST AND THE RESULTANT PRODUCT

(75) Inventor: James C. Sbarro, Parkville, MO (US)

(73) Assignee: Farmland Foods, Inc., Kansas City, MO (US)

( * ) Notice: Subject to any disclaimer, the term of this patent is extended or adjusted under 35 U.S.C. 154(b) by 245 days.

(21) Appl. No.: 11/608,468

(22) Filed: Dec. 8, 2006

(65) Prior Publication Data

US 2007/0149101 A1  Jun. 28, 2007

Related U.S. Application Data

(60) Provisional application No. 60/749,936, filed on Dec. 13, 2005.

(51) Int. Cl.
*A22C 7/00* (2006.01)

(52) U.S. Cl. .................................................... 452/135

(58) Field of Classification Search ......... 452/135–140, 452/174, 198, 148, 149, 160; 426/56, 572, 426/578, 480, 518, 134, 129, 644, 646, 645, 426/641

See application file for complete search history.

(56) References Cited

U.S. PATENT DOCUMENTS

| | | | | |
|---|---|---|---|---|
| 1,959,022 A | * | 5/1934 | Donahoe | 452/149 |
| 2,044,841 A | * | 6/1936 | Fredberg et al. | 426/281 |
| 2,419,424 A | * | 4/1947 | Staab | 452/136 |
| 3,031,310 A | * | 4/1962 | Zolezzi et al. | 426/282 |
| 3,594,189 A | * | 7/1971 | Panattoni | 426/104 |
| 4,628,569 A | * | 12/1986 | Gagliardi, Jr. | 452/166 |
| 6,428,838 B1 | * | 8/2002 | Gagliardi, Jr. | 426/644 |
| 7,214,403 B1 | * | 5/2007 | Peters | 426/641 |

\* cited by examiner

*Primary Examiner*—Thomas Price
(74) *Attorney, Agent, or Firm*—Shook, Hardy & Bacon LLP (57) ABSTRACT

The present invention is a method for cutting a picnic roast cut to create a meat cut which includes an exposed bone feature and a squared face. The method for making the exposed bone feature involves trimming shank meat bare from fore shank bones and removing a portion of the fore shank bones at a shank bone bulge. The method for making the squared face involves removing moon muscles, a breast flap, false lean, and loose tissue to form a generally flat surface. When oriented downward, the flat surface aligns with any flat support surface and holds the meat cut in a standing position. The standing position directs the exposed bone feature generally upward in a unique and attractive presentation. Additionally, the present invention relates to the resultant product formed by the same method where the meat cut allows for improved roasting, braising, slow-cooking, and carving of a picnic roast cut.

20 Claims, 11 Drawing Sheets

METHOD FOR MAKING A PICNIC ROAST AND THE RESULTANT PRODUCT

CROSS-REFERENCE TO RELATED APPLICATIONS

This application claims the benefit of U.S. Provisional Application No. 60/749,936, filed Dec. 13, 2005 titled Method for Making a Picnic Roast Cut and the Resultant Product.

STATEMENT REGARDING FEDERALLY SPONSORED RESEARCH OR DEVELOPMENT

Not applicable.

BACKGROUND OF THE INVENTION

This present invention relates to a method for making a Steamship picnic roast and the resultant product. In particular, the present invention relates to a method for cutting a pig carcass to produce a picnic roast cut, and provides a method of trimming the picnic roast cut to produce a meaty and easy to carve Steamship picnic roast.

There exists in the art examples of methods for cutting a standard picnic roast cut from the carcass of the pig. Such examples disclose a method whereby the picnic roast cut is prepared from a pork shoulder, similar to North American Meat Processors Association (NAMP) 403B. In this example, the Boston butt is excluded from the pork shoulder by a straight cut, dorsal to the shoulder joint at an approximate right angle to the belly side of the pork shoulder. Also, in this example, the jowl is excluded by a straight cut. This straight cut is made approximately parallel with the belly side, which is not more than one inch anterior from the half moon muscle, measured on the butt side. Next, fat and skin are removed and beveled to meet the lean on the dorsal edge of the picnic roast cut. As such, the standard picnic roast cut is finished upon removal of additional fat such that the thickness as measured from the center of the butt side is within a range of 0.625 to 1.250 inches. Additional prior art examples provide a method for cutting a boneless picnic roast cut from a pork shoulder. The initial steps are similar between the two; however, all bones, cartilage and skin are removed from this picnic roast cut, thereby exposing a cross-section of the cushion on the belly side of the picnic roast cut and a full cross-section of the supraspinatus.

The standard picnic roast cut contains moon muscles and shank meat that covers the fore shank bones. However, in recent years, convenience and quality of presentation have become increasingly important to both consumers and food service distributors. Accordingly, the present invention is directed to the preparation and service of an innovative meat product, one which provides an aesthetic and easy-to-handle meat product. Such a product is quite suitable for home preparation and consumption. While particularly suited for sales in retail food markets, butcher shops, and grocers, the inventive meat product may also be sold to restaurants for commercial preparation and sale.

As such, the present invention discloses a method for trimming shank meat from the fore shank bones (radius and ulna), removing the breast flap at the natural seam, and removing all moon muscles, starting at the main muscle seam and then continuing back toward the shank end. The present invention also discloses a method for shortening the fore shank bones at a shank bone bulge. In addition, the present invention discloses a method for forming a squared face on the picnic roast cut.

Further, the present invention will produce a unique and attractive meat cut that facilitates roasting, braising, or slow-cooking, as well as extending shelf-life. Further, the present invention improves cooked appearance and produces a tender bite and juicy flavor.

BRIEF SUMMARY OF THE INVENTION

Accordingly, the present invention provides a method for making a Steamship picnic roast and the resultant product. The first step of the method involves separating a pork shoulder from a pig carcass as it is understood by one of ordinary skill in the art. This step involves making a cut perpendicular to the general line of the back, and is usually necessary to cut across the second or third rib. As such, the pork shoulder retains 1½ to 2½ ribs upon separation from the loin and side. In the next step, the neck bones, rib bones, and sternum are removed, leaving a maximum soft tissue on the shoulder. A front foot is then sawed from the pork shoulder, generally 1½ inches above a knee joint. In the fourth step, the jowl is removed by a straight cut, beginning at the natural crease, made parallel to the first cut that separated the pork shoulder from the pig carcass. Lastly, the picnic roast cut requires excluding the Boston butt. The Boston butt is removed by a straight cut, dorsal to a shoulder joint, at an approximate right angle with the belly side of the pork shoulder. A cutting tool is used to form a cross-section of a face on the scapula that is shaped as a tear-drop. In addition, all joint bones visible on the face are removed.

The portion that remains is called the picnic roast cut, as is understood by one of ordinary skill in the art. The picnic roast cut includes, a portion of a scapula, an arm bone, a humerus bone, a knee joint, and fore shank bones. The fore shank bones include an ulna bone, a radius bone, and a bone bulge. The picnic roast cut also includes a layer of skin and fat, a main muscle, shank meat, breast flap, false lean (cutaneous colli), small muscles, and moon muscles. The breast flap includes, among other meat sections, a lattissimus dorsi and overlying pectorales superficialis. The small muscles include, among other meat sections, a teres major and subscapularis. The moon muscles include, among other meat sections, pectorales profundi and omotransversarius.

Once the picnic roast cut is separated from the Boston Butt, the next step is to form the Steamship picnic roast from the picnic roast cut. First, the bone bulge portion of the shank bone is then removed above the upper knee joint, still retaining as much the shank bone as possible. The resultant cross-section should not expose any growth plate cartilage, rather all bone and marrow.

Next, the skin is completely removed and the fat on the exterior is trimmed to a uniform thickness. Preferably the thickness may range from 0.25 to 0.40 inches. Next, any loose or hanging fat on any face is removed. Next, the shank meat is completely trimmed from both sides of the fore shank bones. At this stage, the breast flap may be removed along with associated fat and lean trim. When removing the breast flap, the overlying pectorales superficialis is removed and the lattissimus dorsi is completely removed at the seam.

Sixth, all of the moon muscles are completely removed. In particular, this step requires removal of the pectorales profundi and omotransversarius—starting at the main muscle seam and continuing back toward the shank end. Next, the false lean on the fat side of the picnic roast cut is removed along with major blood clots and any loose trim. Any small muscles, such as the teres major and subscapularis, that overlie the humerus bone at the butt separation may remain.

Last, as part of the facing operation, the visible glands and loose surrounding tissue are removed from the face; as such, the Steamship picnic roast is complete. This facing procedure forms a squared face on the Steamship picnic roast. The squared face is generally a flat surface that allows the Steamship picnic roast to rest in a standing position when the flat surface is orientated downward toward another flat surface such as a table, meat counter, or shelf. In the standing position, the fore shank bones are directed substantially upwards creating a unique and aesthetic appearance. Another beneficial characteristic of the standing position is that it provides for improved carving and cooking of the Steamship picnic roast.

Additional advantages, and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views.

DETAILED DESCRIPTION OF THE INVENTION

The present invention is directed to a method for cutting a Steamship picnic roast from a picnic roast cut.

Figure 1:
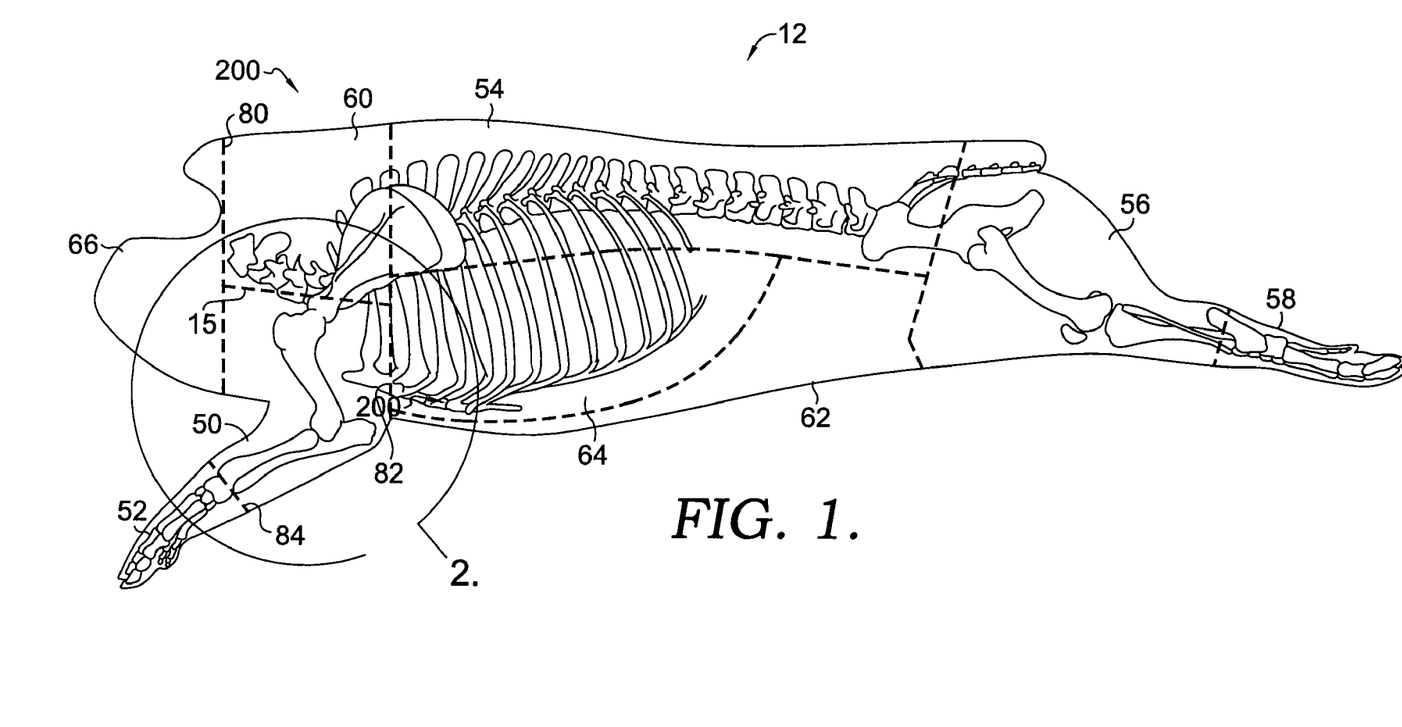
FIG. 1 is a lateral skeletal view of a pig carcass showing the picnic roast cut and the loin-shoulder, jowl-shoulder, picnic-foot, and picnic-butt separations.
Figure 2:
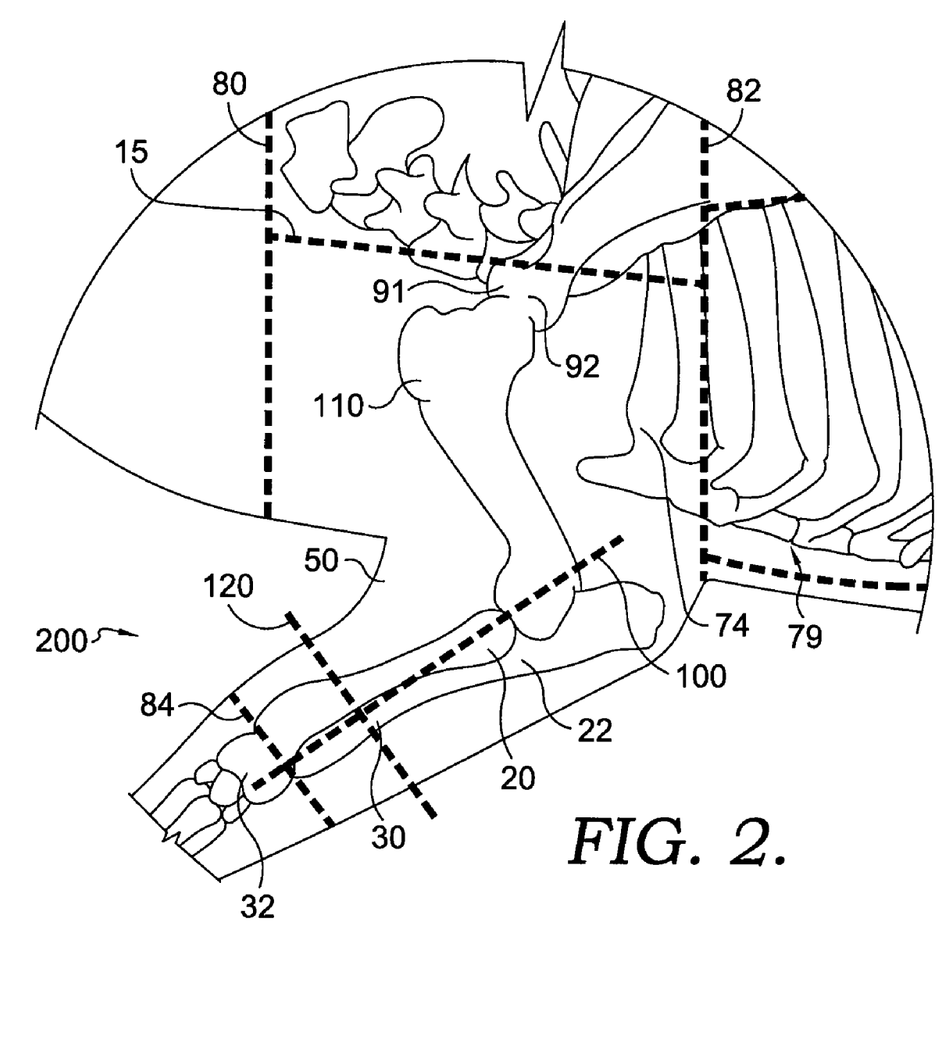
FIG. 2 is an enlarged lateral skeletal view of the picnic roast cut showing the bones and muscles.
Figure 3:
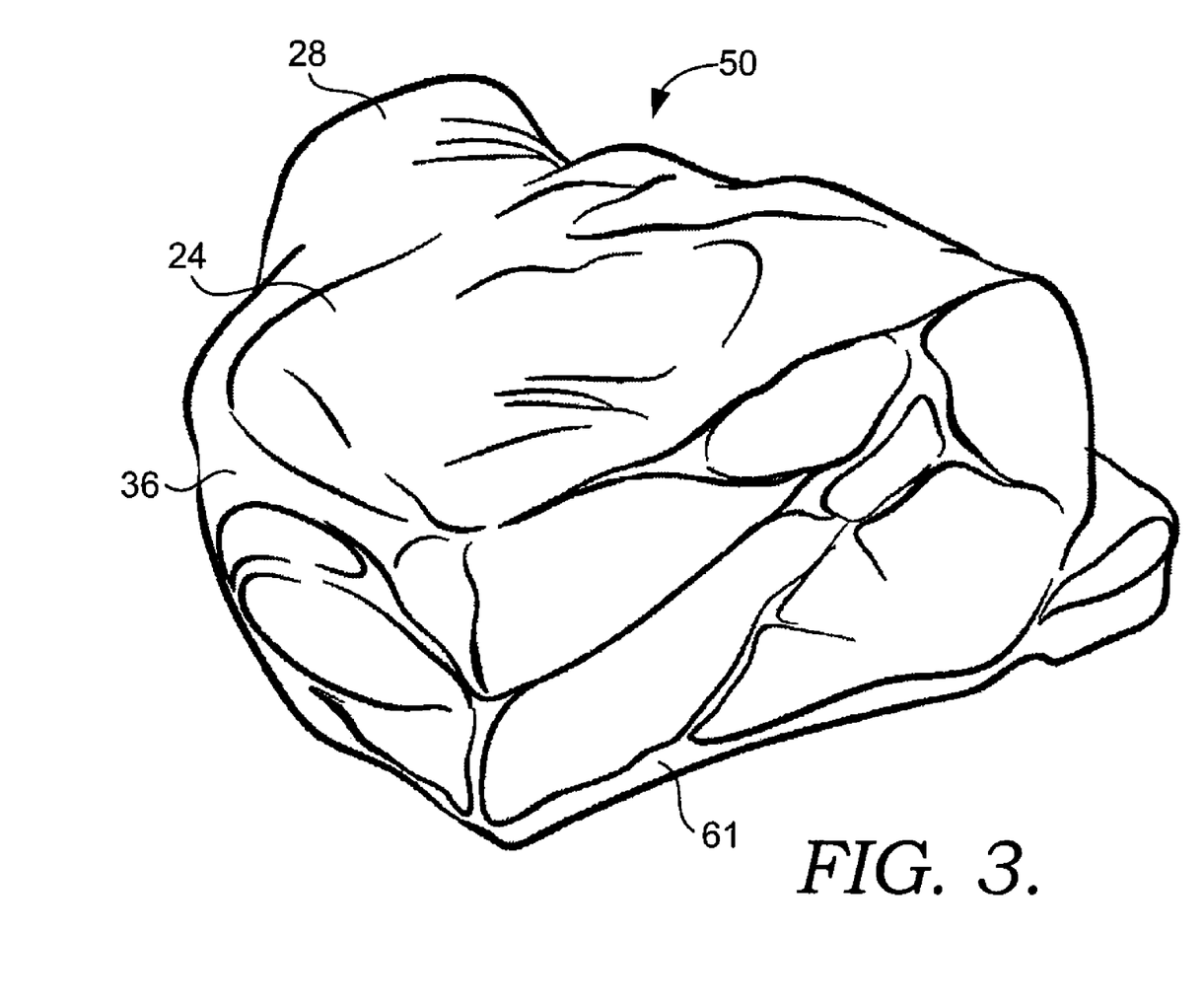
FIG. 3 is a perspective view of the picnic-butt separation face.
Figure 4:
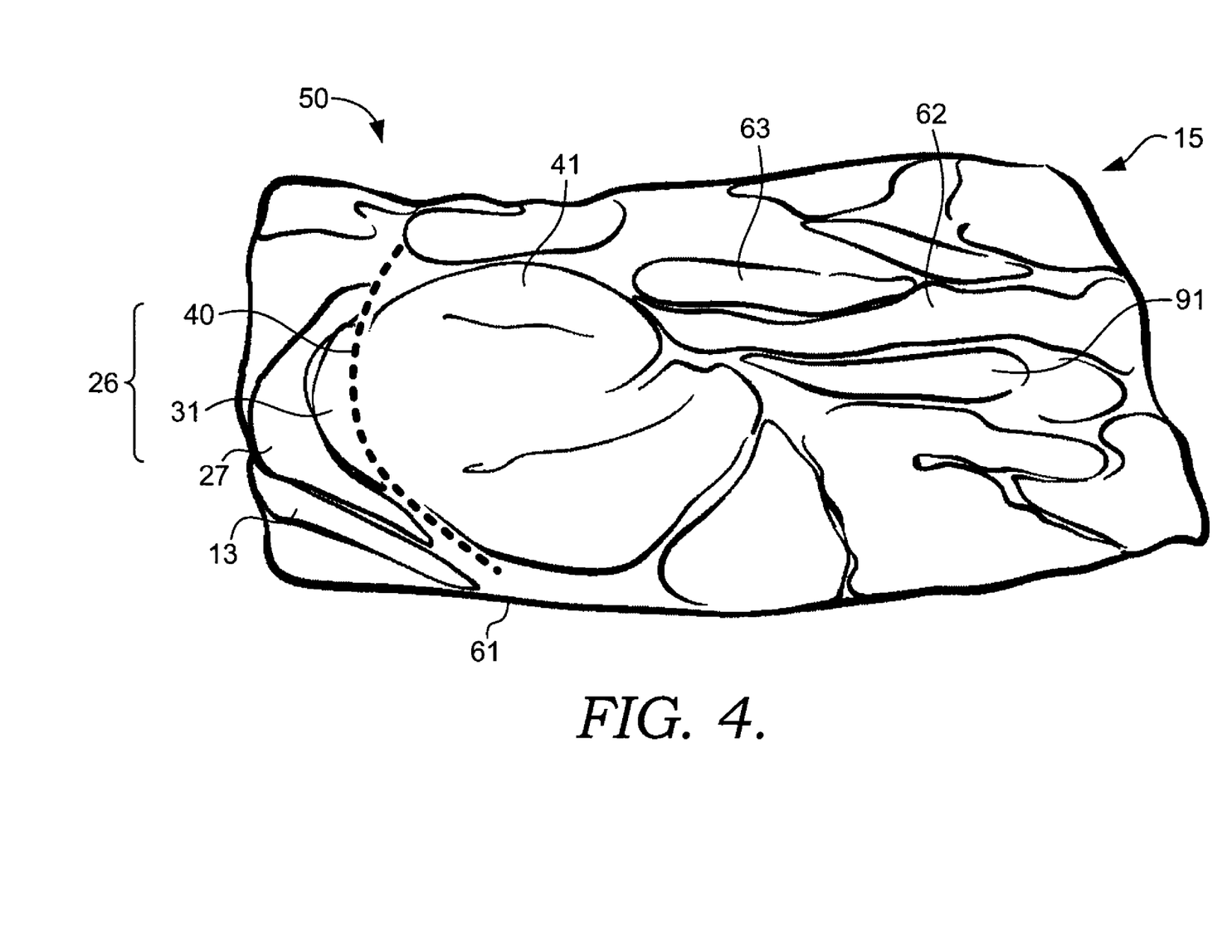
FIG. 4 is a perspective view of the fore shank bone bulge separation.
Figure 9:
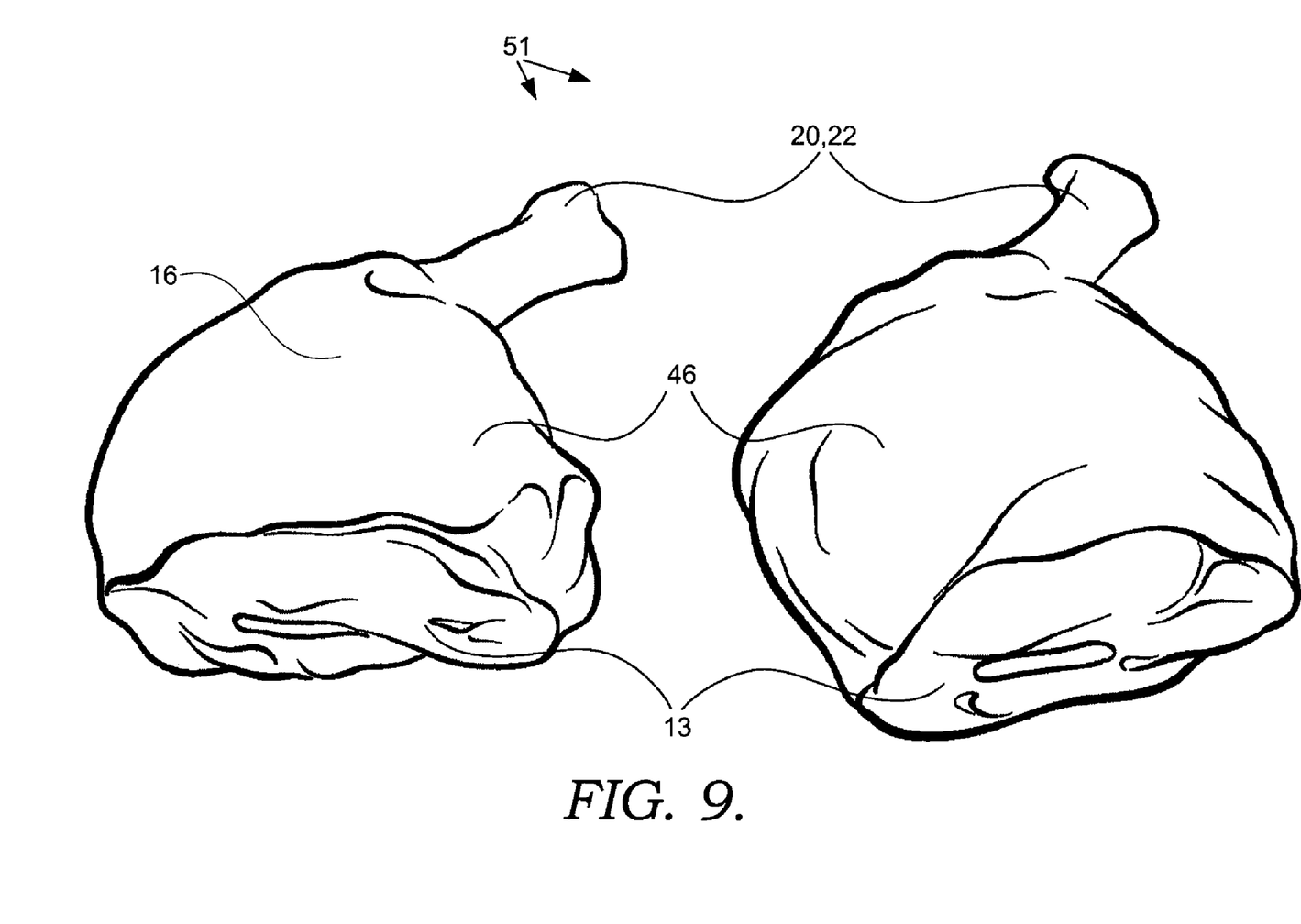
FIG. 9 is a perspective view of the backside of the Steamship picnic roast.

Referring to the drawings in greater detail and initially to FIGS. 1-11, a method for making a Steamship picnic roast 51 (FIG. 7) is described. FIG. 1 shows a lateral skeletal view of a pig carcass 12 that is sectioned by dashed lines representing incisions, e.g. cuts 15, 80, 82, and 84, which separate the pig carcass 12 into primary sections of meat. An exemplary embodiment of a pig carcass 12 is a chilled fresh pig carcass produced similar to North American Meat Processors Association (NAMP) 403B. The primary sections of meat that are carved from the pig carcass 12 are a Boston butt 60, a ham 56, a loin 54, spareribs 64, a side 62, a picnic roast cut 50, a fore foot 52, a hind foot 58, and a jowl 66. The present invention relates to the picnic roast cut 50 section, typically defined as a wholesale cut of the pork carcass that generally includes the front leg and surrounding muscles. The picnic roast cut 50 is depicted as an enlarged view in FIG. 2, which includes a portion of a scapula 91, a humerus bone 110, fore shank bones 20, 22, and a knee joint 32. The pair of fore shank bones include the radius bone 20 and the ulna bone 22. Further, the foreshank bones have a bone bulge 30 on the bone end adjacent to the knee joint 32. Additionally, as shown in FIGS. 3, 4 and 9, the picnic roast cut 50 includes a layer of skin and fat 61, a breast flap 24, shank meat 28, a main muscle 41, false lean 13. The breast flap 24 includes, among other meat sections, a lattissimus dorsi, and an overlying pectorales superficialis (not shown). With reference to FIG. 4, the small muscles include, among other meat sections, the teres major 62 and the subscapularis 63. The moon muscles 26 include, among other meat sections, a pectorales profundi 27 and omotransversarius 31.

The method of separating the picnic roast cut 50 from the pig carcass 12 will now be discussed. The picnic roast cut 50 is initially separated from the side 62, spareribs 64, and loin 54 by incising with a cutting utensil similar to cutting tool 5 (FIG. 4) along a loin-shoulder separation cut 82 as referenced in FIG. 1. It should be understood that other suitable cutting utensils could be used, such as a hand saw, serrated knife, or band saw.

As depicted in FIG. 2, the loin-shoulder separation cut 82 is a straight cut approximately perpendicular to the general line of the spine. It is generally necessary to cut across a second or third rib substantially parallel to the posterior edge of the first rib 74. The loin-shoulder separation cut 82 completely separates a pork shoulder 200, comprised of the Boston butt 60, picnic roast cut 50, fore foot 52, jowl 66, neckbones, and rib and sternum 79, from the rest of the pig carcass 12. Once the shoulder 200 is separated from the pig carcass 12, formation of the picnic roast cut 50 may commence.

First, with reference to FIG. 2, the neckbones, and the ribs and sternum 79 are separated from the shoulder 200. Next, the fore foot 52 (FIG. 1) is completely removed from the shoulder 200. This separation is performed along a picnic-foot separation cut 84, which is made by slicing with a cutting tool 5 along a section 1½ inches above the knee joint 32. The picnic-foot separation cut 84 is shown in the perspective view in FIG. 6.

Next, returning to FIG. 1, the jowl 66 is removed from the shoulder 200 along the jowl-shoulder separation cut 80. The jowl-shoulder separation cut 80 is a straight cut beginning at the natural crease and is directed approximately parallel with the ventral side (belly side) of the pig carcass 12. Further, the jowl-shoulder separation cut 80 is no more than one inch anterior from a pectorales profundi (half moon muscle) 27, measured on the side of the Boston butt 60. The jowl-shoulder separation cut 80 completely excludes the jowl 66 from the shoulder 200, now comprised of the Boston butt 60 and the picnic roast cut 50.

Last, the Boston butt 60 is completely separated from the shoulder 200 with a picnic-butt separation cut 15, leaving the picnic roast cut 50 as the remainder, similar to NAMP 405 Pork Shoulder, Picnic. The picnic-butt separation cut 15 is approximately perpendicular to the separation cuts 80 and 82, and is made ½ inch below the ventral edge of a scapula 91, or dorsal to a shoulder joint 92. The resultant shape of the cross-section of the portion of the scapula 91 is a tear-drop (FIG. 4). In addition, no portions of any joint bones should be visible on the face of the picnic-butt separation cut 15. The cutting tool 5 should be used to make the cut, which is directed at an approximate right angle to the ventral side (belly side) of the pig carcass 12. It is preferred that a minimum number of cuts are used while making separation cuts 80, 82, 84, and 15, and that no resultant knife cuts penetrate into any muscles on the picnic roast cut 50. An exemplary embodiment of the picnic roast cut 50 is an eight to twelve-pound pork shoulder picnic, i.e. NAMP Pork Shoulder, Picnic 405; however, this is not meant to be limiting.

Upon separation of the picnic roast cut 50 from the pig carcass 12, the formation of the Steamship picnic roast 51 (FIGS. 10 and 11) may commence. Depicted in FIGS. 3 and 4, an exterior of the picnic roast cut 50 as illustrated in this stage of processing still retains a portion of overlying skin, which is part of the layer of skin and fat 61. The cutting tool 5 is used to slice the layer of skin and fat 61 such that the skin is completely removed from the picnic roast cut 50. Further, fat is trimmed from the layer of skin and fat 61 to a target thickness of 0.25 inches, wherein a newly formed fat cover 46 (FIG. 9) should not exceed 0.4 inches in any location. FIGS. 7-10 show the skin removed and depict the fat cover surface as smooth and well rounded. Loose hanging fat, all visible glands, exposed blood vessels, and associated non-lean tissue, are also removed at this stage via the cutting tool 5 as part of facing process. It should be understood that the loose hanging fat, visible glands, exposed blood vessels, and associated non-lean tissue are not shown in FIGS. 3-11 because they have been previously removed.

FIGS. 3-6 show illustrative embodiments for butchering the picnic roast cut 50. Any arrangement for supporting the picnic roast cut 50 will suffice for practicing the present invention so long as all portions of the picnic roast cut 50 are suitably accessible for processing. In the illustrated example, the picnic roast cut 50 is supported by a cutting surface 85 (FIG. 5) thereby freeing both a butcher's hands 87 for use in the process.

Figure 5:
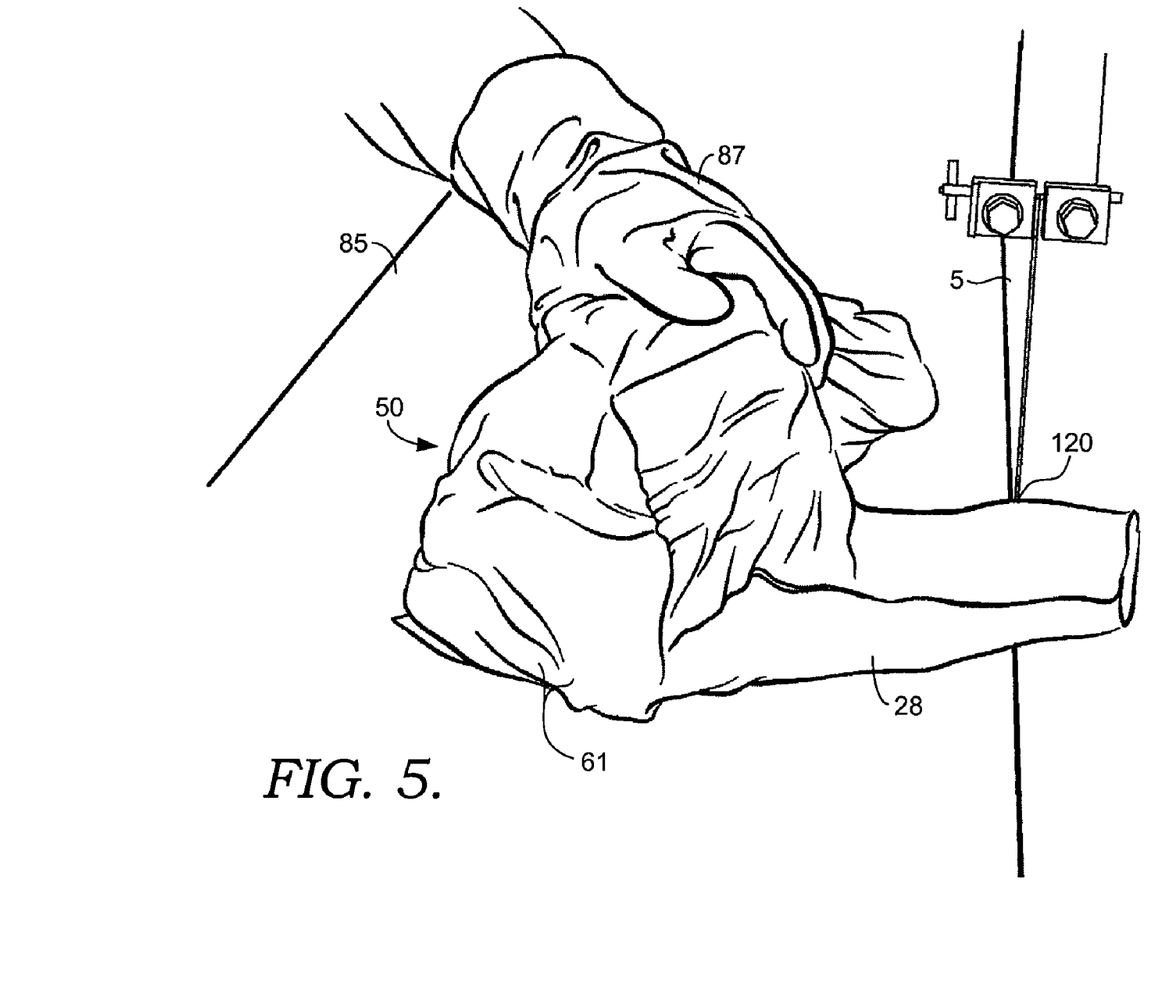
FIG. 5 is a perspective view similar to FIG. 4, but where the fore shank bones are trimmed at the bone bulge portion.
Figure 6:
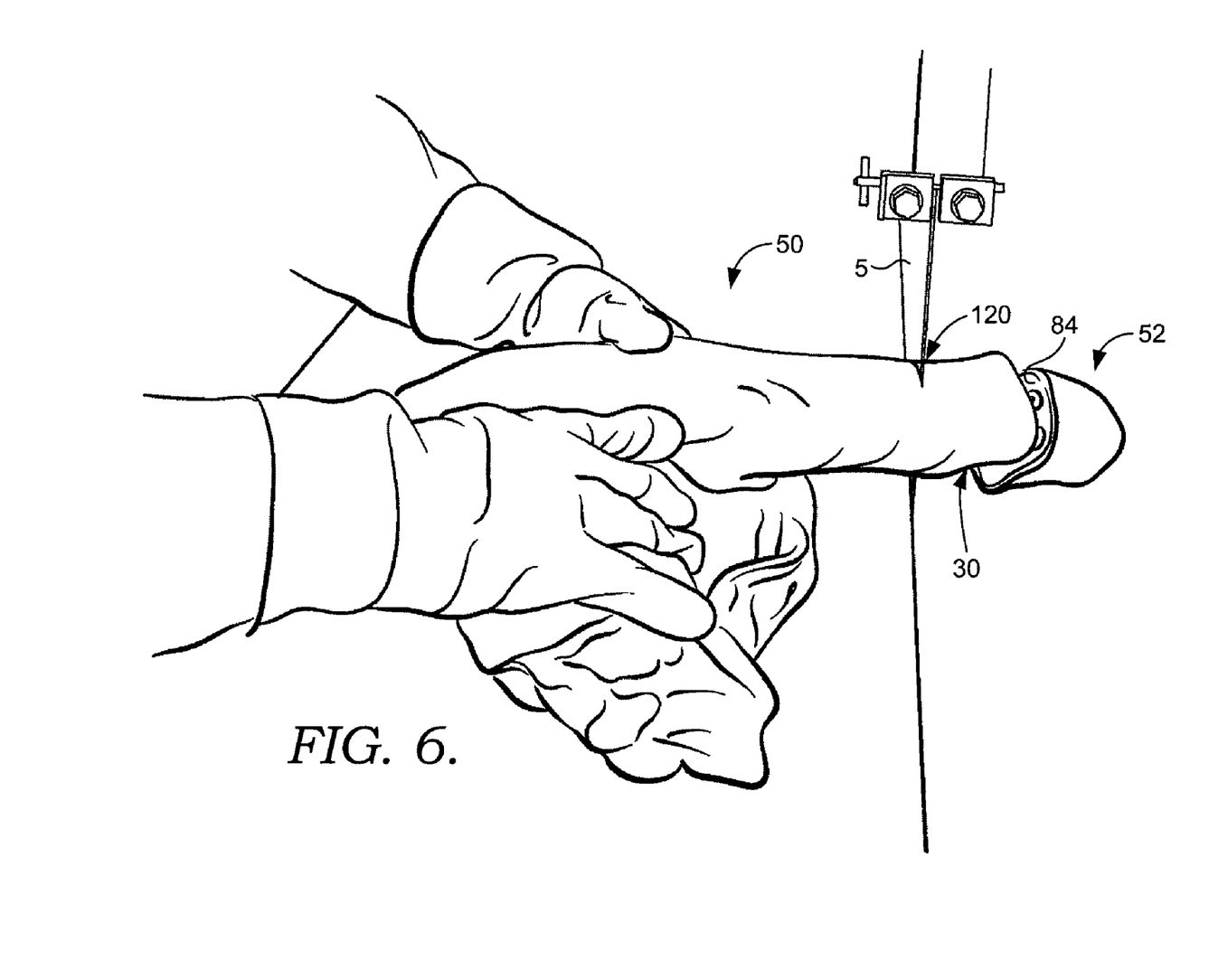
FIG. 6 is a perspective view of the picnic roast cut.

As shown in FIGS. 5 and 6, the fore shank bones, 20, 22, are shortened by operation of a cutting tool 5 at the bone bulge portion 30 of the fore shank bones. The incision is directed along the bone bulge separation cut 120 (FIGS. 5 and 6), which is aligned perpendicular to a fore shank axis 100 (FIG. 2). The fore shank axis 100 is aligned substantially parallel to the fore shank bones, 20, 22. The bone bulge separation cut 120 is complete when a portion of the fore shank bones, 20, 22, which was between the knee joint 32 and the bone bulge portion 30, can be completely removed.

Figure 7:
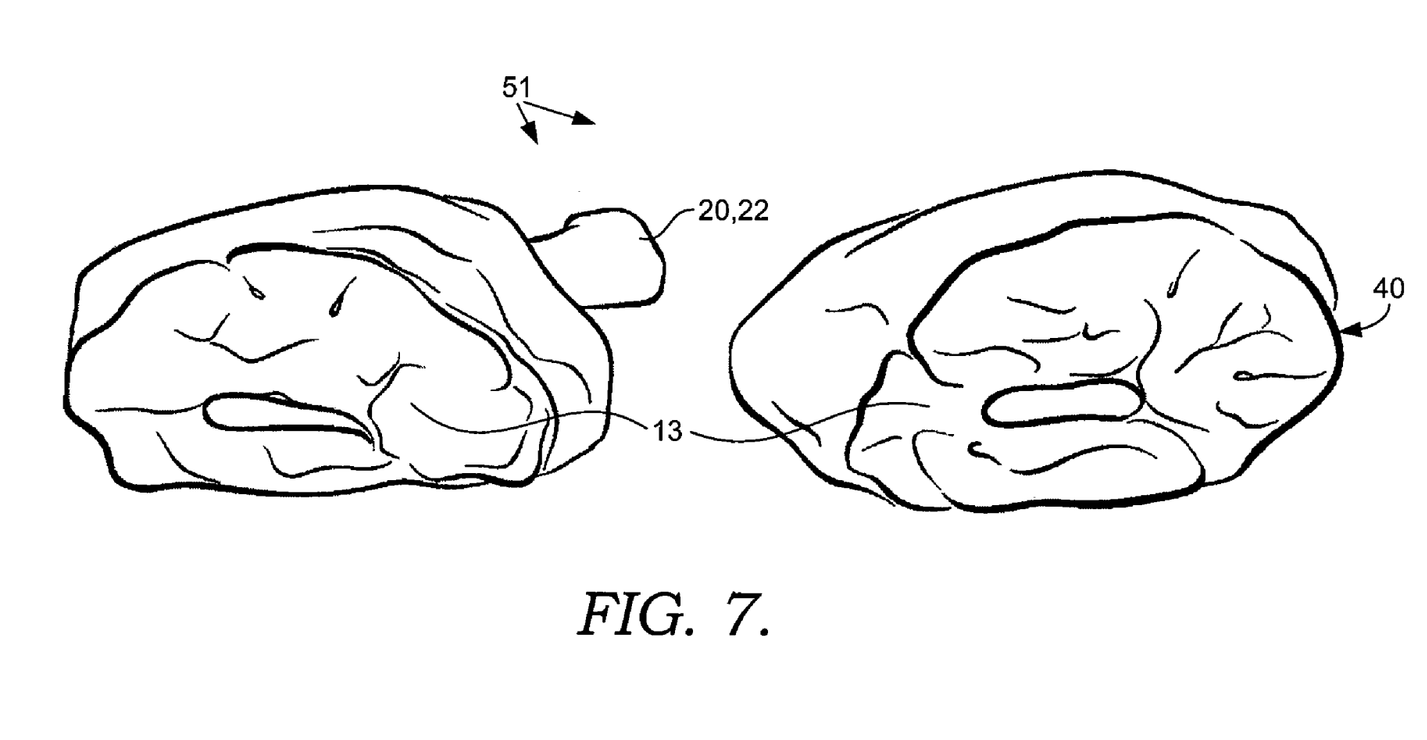
FIG. 7 is an end view of the Steamship picnic roast.
Figure 8:
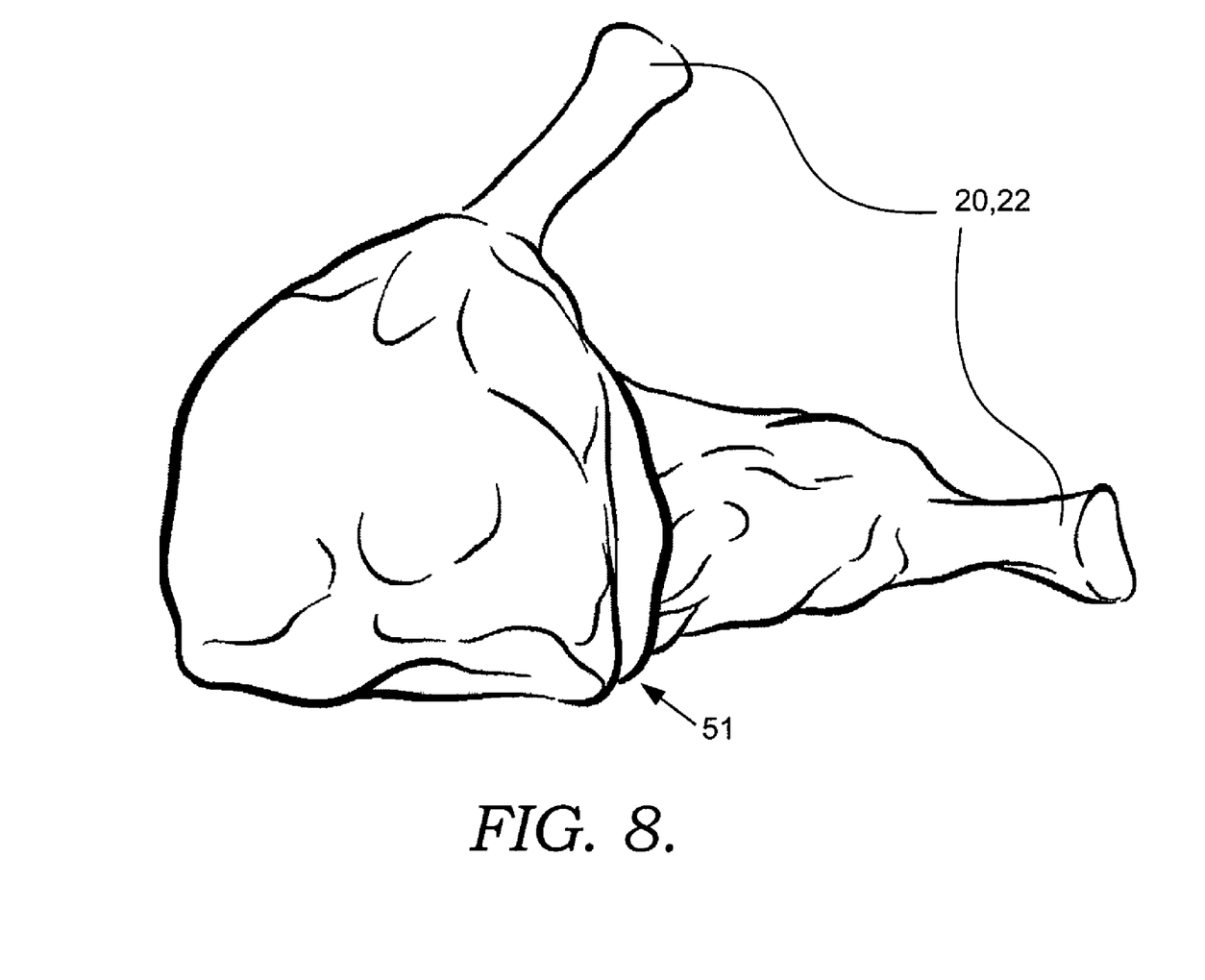
FIG. 8 is a perspective view of the finished Steamship picnic roast in both standing and reposed positions.

Next, as shown in FIG. 6, the shank meat 28 trimmed from the fore shank bones, 20, 22, such that the shank meat 28 is completely removed. As such the ulna 22 and radius bones 20 are exposed, as seen in FIGS. 7-11. The preferred process requires that the shank meat 28 is completely removed from both sides of the fore shank bones, 20, 22. Returning to FIG. 6, the breast flap 24 is removed at a natural breast flap seam 36, wherein the breast flap 24 has been removed. The breast flap 24 is comprised of lattissimus dorsi and overlying pectorales superficialis (not shown). Cutting tool 5 is used to remove the breast flap 24. An exemplary depiction of the shank 28 and the breast flap 24 removed from the Steamship picnic roast 51 is shown in FIG. 8.

The moon muscles 26 are removed by the cutting tool 5 from the portion of the picnic roast cut 50 that adjoined the jowl 66. Specifically, the moon muscles 26 include the pectoralis profundi 27 and omotransversarius 31, as shown on the perspective view of the picnic-butt separation cut 15 in FIG. 4. These moon muscles 26 are completely excluded from the picnic roast cut 50 by incising at the main muscle seam 40 and continuing back toward the shank meat 28 end, following a natural contour of the picnic roast cut 50 until the main muscle seam 40 disappears. The main muscle seam 40 is demonstrated in FIG. 7 with the moon muscles 26 completely excluded. During this step in the formation procedure, the main muscles 41 should be left entirely intact. A preferred process for removing the moon muscles 26 allows for no additional incisions or damage to the remaining bones and muscles of the picnic roast cut 50. Additionally, at this stage, the false lean (not shown) is excluded from the picnic roast cut 50.

The next step of the procedure in forming the Steamship picnic roast 51 consists of removing the removing major blood clots and any loose trim, wherein FIG. 3 shows the blood clots and loose trim previously removed. Furthermore, the humerus bone 110 (FIG. 2) should not be exposed.

Figure 11:
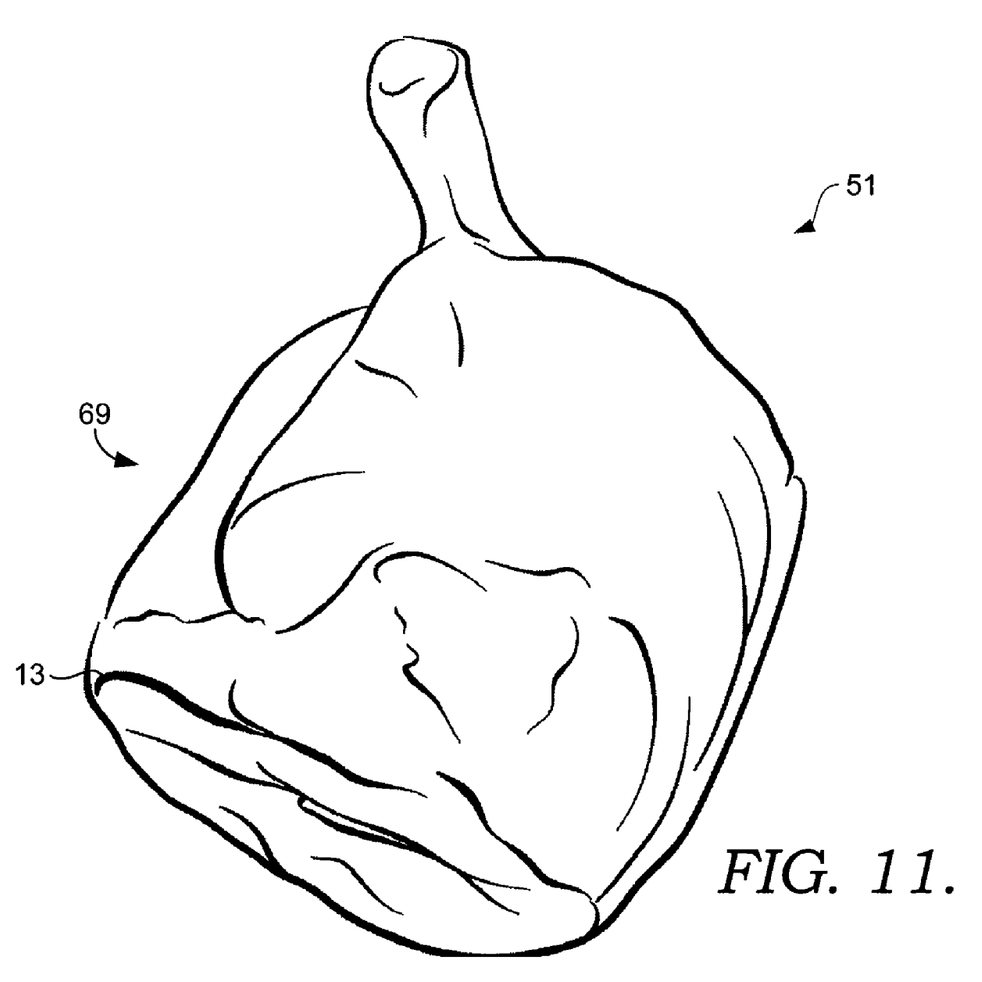
FIG. 11 is a perspective view of the reposed position.

Then the formation of a squared face 13 on the picnic-butt separation cut 15 may commence. The facing operation includes removing with the cutting tool 5 all visible glands and loose surrounding tissue. The preferred embodiment of the squared face 13 is a generally flat surface, as shown in FIGS. 7, 9, and 11. The squared face 13 is completed at this stage in the formation process. Moreover, all cutting performed on the picnic roast cut 50 for the resultant Steamship picnic roast 51 is complete.

Figure 10:
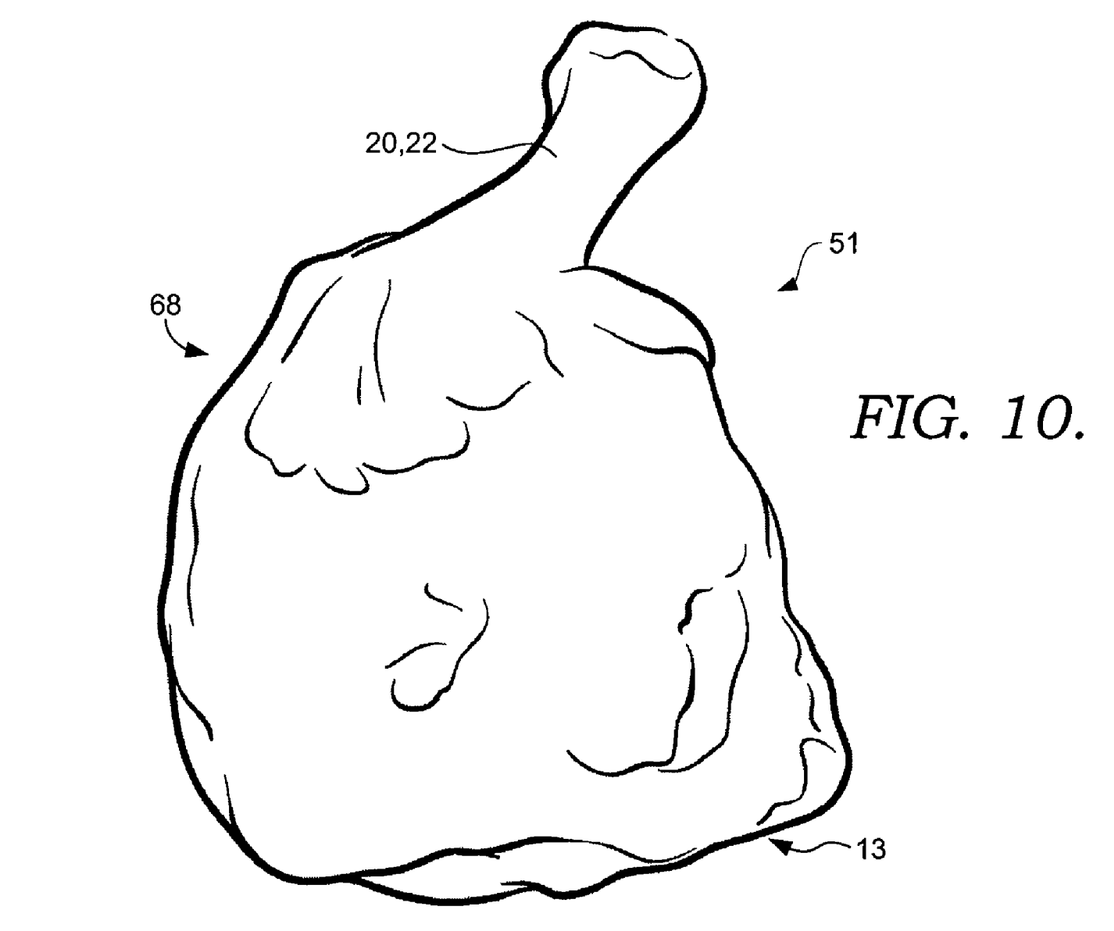
FIG. 10 is a perspective view of the standing position.

The Steamship picnic roast 51, as shown in FIG. 10, is able to stand upright on a flat surface, e.g., the cutting surface 85 (FIG. 5), by placing the squared face 13 (FIG. 7) downward toward the flat surface. This orientation displays the Steamship picnic roast 51 in a standing position 68 (FIG. 10). The standing position 68 directs the fore shank bones 20, 22, in a generally upward direction. A functional benefit of the standing position 68 is that the squared face 13 allows for improved stability and ease of handling. More specifically, the standing position 68 provides for the fixed and stable orientation of the Steamship picnic roast 51 on flat surfaces and sets a standard orientation of the Steamship picnic roast 51. In addition, the standing position 68 provides a unique and attractive meat cut that facilitates roasting, braising, or slow-cooking, as well as extending the shelf-life. Moreover, the standing position 68 improves cooked appearance, facilitates carving the Steamship picnic roast 51, and produces a tender bite and juicy flavor. Alternatively, the Steamship picnic roast 51 may assume a reposed position 69, as shown in FIG. 11, wherein the squared face 13 is exposed.

The present invention has been described in relation to particular embodiments, which are intended in all respects to be illustrative rather than restrictive; changes may be made in form and detail. Alternative embodiments will become apparent to those skilled in the art to which the present invention pertains without departing from its scope. For example, the description and figures refer specifically to a method for preparing a Steamship picnic roast from a picnic roast cut. However, the method of the present invention could be applied to all classes of swine beyond the domesticated pig, encompassing all wild relatives, e.g. boar. Further, the process can be performed in any alternative manner where the order of the formation procedure is modified, where the specific steps are combined, reversed, or eliminated.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated. It will be appreciated by persons skilled in the art that the present invention is not limited to what has been particularly shown and described hereinabove. Rather, all matter herein set forth or shown in the accompanying drawings is to be interpreted as illustrative and not limiting.

The invention claimed is:

1. A method for forming a meat cut from a picnic roast cut, the picnic roast cut having shank meat, a portion of a scapula, a humerus bone, moon muscles, a knee joint, and fore shank bones, the fore shank bones having an ulna bone and a radius, said method comprising:

removing the knee joint;

trimming the shank meat from the fore shank bones;

removing a portion of the fore shank bones above the knee joint; and     removing the moon muscles.

2. The method as recited in claim 1, wherein the radius and the ulna have a bone bulge, and wherein the fore shank bones are shortened to the bone bulge.

3. The method as recited in claim 1, wherein the portion of a scapula exposes an tear-shaped cross-section.

4. The method as recited in claim 1, the meat cut having a main muscle seam from which the moon muscles are removed.

5. The method as recited in claim 1, wherein loose tissue is trimmed to form a squared face on the meat cut.

6. The method as recited in claim 5, wherein the squared face is generally planar and aligns with a support surface whereby creating an upper portion and lower portion of the meat cut.

7. The method as recited in claim 5, wherein the meat cut rests for carving on the squared face such that the fore shank bones are located on the upper portion of the meat cut.

8. The method as recited in claim 1, wherein the fore shank bones retain at least one small muscle.

9. The method as recited in claim 1, wherein the moon muscles include at least a pectoralis profundi and omotransversarius.

10. The method as recited in claim 1, wherein cutaneous colli and a breast flap are removed from the meat cut.

11. The method as recited in claim 1, wherein excess skin, fat, and tissue covering the meat cut is removed, creating a smooth surface.

12. A meat cut from a picnic roast cut, the meat cut comprising:

a squared face formed as a generally planar resting surface by removal of visible glands, loose surrounding tissue, a breast flap, and moon muscles; and     an exposed bone feature formed by trimming shank meat down to an ulna and a radius, and then trimming the radius and ulna at a bone bulge above a knee joint, wherein the generally planar resting surface holds the meat cut stable on a support surface when in a standing position.

13. The meat cut as recited in claim 12, wherein the meat cut includes a portion of a scapula, a humerus bone, a fore shank bones, a cover layer of fat, a main muscle, and a main muscle seam, the fore shank bones include an ulna bone and a radius bone.

14. The meat cut as recited in claim 12, wherein said standing position is a substantially upward position.

15. A method for forming a meat cut from a pig carcass, the pig carcass including a loin, a side, a fore foot, a jowl, and a pork shoulder, the pork shoulder having a Boston butt and a picnic roast cut, the picnic roast cut including a portion of a scapula, a humerus bone, a knee joint, neckbones, a first rib, a sternum, moon muscles, shank meat, and fore shank bones, the fore shank bones having a radius bone, an ulna bone, and a bone bulge, said method comprising:

separating the pork shoulder from the loin and side at an incision posterior of the first rib;

separating the pork shoulder from the jowl;

separating the fore foot from the pork shoulder;

separating the picnic roast cut from the Boston butt at the portion of a scapula;

trimming the shank meat from the radius bone and the ulna bone;

removing the knee joint; and removing the moon muscles such that the humerus bone is not exposed, wherein a face is formed on the meat cut.

16. The method as recited in claim 15, wherein the face is generally squared.

17. The method as recited in claim 16, wherein the radius bone and the ulna bone are trimmed at the bone bulge.

18. The method as recited in claim 17, wherein the portion of the scapula exposes an tear-shaped cross-section.

19. The method as recited in claim 18, wherein the squared face is generally planar and aligns with a support surface whereby creating an upper portion and lower portion of the meat cut.

20. The method as recited in claim 19, wherein the meat cut rests for carving on the squared face such that the ulna bone and the radius bone are located on the upper portion of the meat cut.

* * * * *